United States Patent
Momose

(10) Patent No.: US 8,477,281 B2
(45) Date of Patent: Jul. 2, 2013

(54) LIQUID CRYSTAL DEVICE, MANUFACTURING METHOD THEREOF, AND ELECTRONIC DEVICE

(75) Inventor: Yoichi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 13/071,716

(22) Filed: Mar. 25, 2011

(65) Prior Publication Data
US 2011/0242475 A1    Oct. 6, 2011

(30) Foreign Application Priority Data

Apr. 1, 2010   (JP) ................. 2010-084908

(51) Int. Cl.
   *G02F 1/1339*    (2006.01)
(52) U.S. Cl.
   USPC ........................................... 349/153
(58) Field of Classification Search
   USPC ........................................... 349/153
   See application file for complete search history.

(56) References Cited

U.S. PATENT DOCUMENTS

| | | | | |
|---|---|---|---|---|
| 6,104,467 | A * | 8/2000 | Nakahara et al. | 349/189 |
| 7,679,708 | B2 | 3/2010 | Momose et al. | |
| 2006/0139563 | A1 | 6/2006 | Momose et al. | |
| 2008/0123032 | A1 * | 5/2008 | Taniguchi et al. | 349/113 |
| 2009/0195738 | A1 * | 8/2009 | Yamada et al. | 349/110 |

FOREIGN PATENT DOCUMENTS

| | | |
|---|---|---|
| JP | 2005-156796 A | 6/2005 |
| JP | 2006-184378 A | 7/2006 |
| JP | 2006-184381 A | 7/2006 |
| JP | 2006-184382 A | 7/2006 |

\* cited by examiner

*Primary Examiner* — Lucy Chien
(74) *Attorney, Agent, or Firm* — ALG Intellectual Property, LLC

(57) ABSTRACT

A liquid crystal device includes an element substrate on a surface of which a display element region is formed that includes a MOS-FET array circuit and an extension of a reflective electrode superposed on the MOS-FET array circuit; a counter substrate disposed so as to oppose the surface of the element substrate having the display element region, and including a transparent electrode formed on a surface opposing the element substrate; a seal member provided between the element substrate and the counter substrate in a loop shape so as to surround the display element region; and liquid crystal enclosed in the region surrounded by the seal member; and the seal member is not superposed on the extension of the reflective electrode in a region along an outer peripheral edge of the element substrate.

11 Claims, 12 Drawing Sheets

LIQUID CRYSTAL DEVICE, MANUFACTURING METHOD THEREOF, AND ELECTRONIC DEVICE

Japanese Patent Application No. 2010-084908, filed Apr. 1, 2010 is incorporated by reference in its entirety herein.

BACKGROUND

1. Technical Field

The present invention relates to a liquid crystal device, a manufacturing method thereof, and an electronic device including the liquid crystal device.

2. Related Art

Electro-optical devices such as a liquid crystal device are employed in color image display units of electronic devices such as a projector and a viewfinder of a digital camera. Recently, reflective liquid crystal devices have come to be focused on, because of their merits such as saving power by utilizing external light, and higher image quality due to reduced gaps between pixels.

The reflective liquid crystal device includes, for example as disclosed in JP-A-2005-156796, an element substrate with a display element region formed on a surface thereof, the display element region including a driver circuit and a reflective electrode superposed on the driver circuit; a counter substrate disposed so as to oppose the surface of the element substrate with the display element region, and having a transparent electrode formed on a surface opposing the element substrate; and liquid crystal tightly enclosed between the substrates.

A process of manufacturing the reflective liquid crystal device includes superposing a plurality of driver circuits and reflective electrodes on a mother substrate constituted of monocrystalline silicon, glass, or the like, arranging a seal member around the display element region, bonding the counter substrate to the mother substrate by means of the seal member, and cutting the bonded substrates into individual liquid crystal devices.

According to a technique disclosed in JP-A-2005-156796, a part of the reflective electrode of each liquid crystal device extends to the cutting line on the mother substrate, and the seal member is applied so as to project to the cutting line on the mother substrate along the extending portion of the reflective electrode, so that the liquid crystal can be injected after the cutting process.

The liquid crystal devices, which have been subjected to the cutting process, each include a liquid crystal inlet that is open at the extending portion of the reflective electrode, and the liquid crystal device is completed upon injecting the liquid crystal through the opening and tightly sealing the liquid crystal device with the seal member.

However, with the recent reduction in size of electronic devices such as a projector, reflective liquid crystal devices are also being made smaller in size and with a higher level of integration, to such an extent that the driver circuit is formed at a position right under the region where the reflective electrode extends.

By the manufacturing method according to JP-A-2005-156796, however, since the seal member is disposed so as to project to the cutting line on the mother substrate along the extending portion of the reflective electrode, the seal member is also cut at a position corresponding to the opening for injecting the liquid crystal therethrough, and in this process the driver circuit superposed on the reflective electrode may also be drawn together with the reflective electrode, and be thus damaged.

SUMMARY

An advantage of some aspects of the invention is that a liquid crystal device is provided that can prevent a driver circuit from being damaged and contribute to improving manufacturing yield, and that also a method of manufacturing such a liquid crystal device, as well as an electronic device including the liquid crystal device are provided.

In an aspect, the invention provides a liquid crystal device including an element substrate on a surface of which a display element region is formed that includes a driver circuit and a reflective electrode superposed on the driver circuit; a counter substrate disposed so as to oppose the surface of the element substrate having the display element region, and including a transparent electrode formed on a surface opposing the element substrate; a seal member provided between the element substrate and the counter substrate in a loop shape so as to surround the display element region; and liquid crystal enclosed in the region surrounded by the seal member; wherein the seal member is not disposed on the reflective electrode in a region along an outer peripheral edge of the element substrate.

In the liquid crystal device thus configured, the seal member is not superposed on the reflective electrode in the region along the outer peripheral edge of the element substrate. Accordingly, although the seal member is present in the region along the outer peripheral edge of the element substrate, which is the position to be cut when the mother substrate is cut into the individual element substrates, the reflective electrode can be prevented from being drawn and hence the driver circuit can be prevented from being stripped off or cut, despite the seal member being drawn. Preventing thus the driver circuit from being damaged leads to improved manufacturing yield.

Preferably, at least a part of the reflective electrode may be formed so as to extend as far as an outer peripheral edge of the element substrate.

Extending at least a part of the reflective electrode as far as the outer peripheral edge of the element substrate allows the adjacently located reflective electrodes to be electrically connected to each other, on the mother substrate yet to be cut. Accordingly, although some of the reflective electrodes become charged owing to static electricity in the manufacturing process, the charge diffuses to the adjacent reflective electrodes without causing electrostatic discharge, and therefore the driver circuit located right under the charged reflective electrode can be prevented from suffering electrical damage, which leads to further improvement in manufacturing yield.

Preferably, at least a part of the driver circuit may be formed so as to extend as far as an outer peripheral edge of the element substrate.

Extending at least a part of the driver circuit as far as the outer peripheral edge of the element substrate allows the charge to diffuse to adjacent driver circuits although some of the driver circuits become charged, as in the case of the reflective electrode, and therefore the driver circuit can be kept from suffering electrical damage.

Preferably, the seal member may be not located in a region along an outer peripheral edge of the element substrate.

In this case, since the seal member is not disposed in the region along the outer peripheral edge of the element substrate, the seal member can be kept from being cut in the process of cutting the mother substrate into the individual element substrates. Accordingly, the reflective electrode and the driver circuit can be prevented from being damaged by a tensile force that would otherwise be applied to the seal member in the cutting process, which leads to improved manufacturing yield.

Preferably, the seal member may contain a conductive gap spacer.

Employing the seal member containing the conductive gap spacer allows the seal member to serve to electrically connect the element substrate and the counter substrate, thereby contributing to simplifying the structure and improving manufacturing efficiency.

In another aspect, the invention provides an electronic device including one of the foregoing liquid crystal devices.

The electronic device thus configured presents reliable quality, because of including the liquid crystal device that prevents the driver circuit from being damaged and contributes to improving manufacturing yield. Further, the improved yield results in reduced manufacturing cost.

In still another aspect, the invention provides a method of manufacturing a liquid crystal device, including preparing an element-side mother substrate with a plurality of display element regions aligned on a surface thereof, the display element regions each including a layered region in which a driver circuit and a reflective electrode are layered, the reflective electrode including a discontinuous portion formed at a position between the adjacently located layered regions, and a counter mother substrate disposed so as to oppose the surface of the element-side mother substrate having the display element regions, and having a transparent electrode formed on a surface opposing the element-side mother substrate; forming a seal member in a loop shape so as to surround each display element region on the element-side mother substrate, or a region on the counter mother substrate opposing each display element region; distributing liquid crystal on each region surrounded by the seal member; bonding the element-side mother substrate and the counter mother substrate with the seal member therebetween under a depressurized condition, and bringing the bonded substrates into an atmospheric pressure thereby obtaining a bonded structure; and cutting the bonded structure into each individual layered region; wherein the process of forming the seal member includes a first seal forming process including continuously providing the seal member in a part of the region surrounding each display element region on the element-side mother substrate, and in a direction in which the display element regions are aligned, or in a part of the region on the counter mother substrate opposing each display element region and in a direction in which the opposing regions are aligned; and a second seal forming process including continuously providing the seal member in the remaining region surrounding each display element region on the element-side mother substrate, and in a direction in which the display element regions are aligned, or in the remaining region on the counter mother substrate opposing each display element region and in a direction in which the opposing regions are aligned; and the first seal forming process and the second seal forming process include providing the seal member at a discontinuous portion of the reflective electrode formed between the adjacently located layered regions.

By the method thus arranged, in the first seal forming process the seal member is continuously provided in a part of the region surrounding each display element region on the element-side mother substrate, and in a direction in which the display element regions are aligned, or in a part of the region on the counter mother substrate opposing each display element region and in a direction in which the opposing regions are aligned. Then in the second seal forming process, the seal member is continuously provided in the remaining region surrounding each display element region on the element-side mother substrate, and in a direction in which the display element regions are aligned, or in the remaining region on the counter mother substrate opposing each display element region and in a direction in which the opposing regions are aligned. Serially performing the first seal forming process and the second seal forming process as above allows the seal member to be provided in the regions surrounding the plurality of display element regions or the opposing regions, in a direction in which those regions are aligned, thereby improving manufacturing efficiency. Also, in the first seal forming process and the second seal forming process, the seal member is provided at the discontinuous portion of the reflective electrode formed between the adjacently located layered regions. Accordingly, although the seal member located at a cutting position between the layered regions suffers a tensile force when the mother substrates are cut into the individual layered regions, the reflective electrode can be prevented from being drawn by the tensile force. Thus, the foregoing manufacturing method allows the seal member to be serially formed thereby improving manufacturing efficiency, and prevents the driver circuit, on which the reflective electrode is superposed, from being stripped off or cut, thus improving manufacturing yield.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
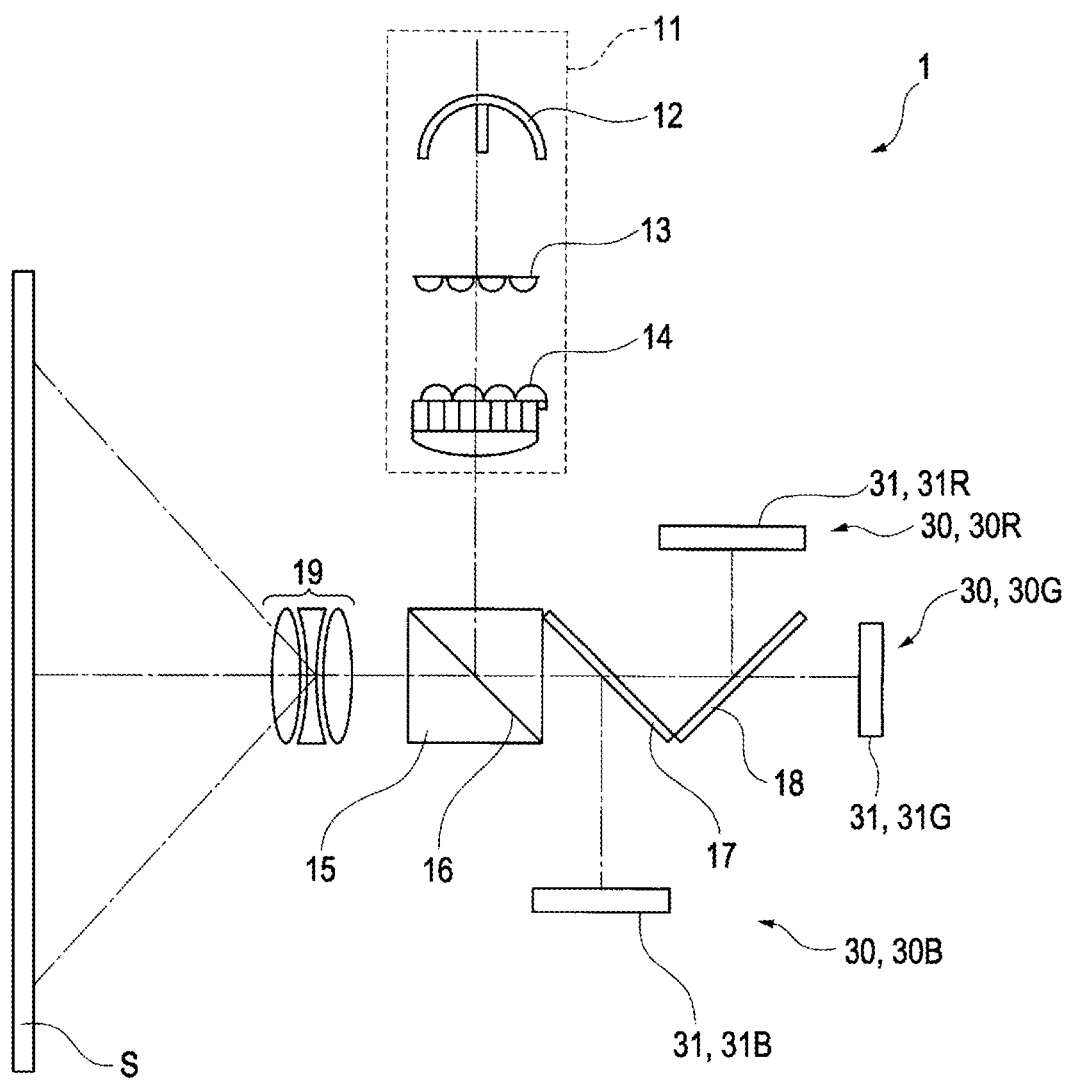
FIG. 1 is a schematic diagram showing a general structure of a projector according to a first embodiment of the invention.

Hereafter, a first embodiment of the invention will be described referring to the drawings.
Configuration of Projector Referring to FIG. 1, a projector 1 modulates a light beam emitted from a light source on the basis of image information to thereby form a color image (image light), and projects an enlarged color image on a screen S.

The projector 1 includes a polarized illumination unit 11 including a light source unit 12, an integrator lens 13 and a polarization conversion element 14, a polarizing beam splitter 15 including an S-polarized light beam reflecting surface 16 that reflects an S-polarized light beam emitted from the polarized illumination unit 11, a dichroic mirror 17 that separates a blue light component (B) from the light reflected by the S-polarized light beam reflecting surface 16 of the polarizing beam splitter 15, and a dichroic mirror 18 that reflects and separates a red light component (R) from the light beam from which the blue light component has been removed. The projector 1 also includes three reflective liquid crystal devices 30 on each of which light of a corresponding color is incident, and the reflective liquid crystal device for red light will be denoted as 30R, the one for green light will be denoted as 30G, and the one for blue light will be denoted as 30B.

The three reflective liquid crystal devices 30 each include a reflective liquid crystal panel 31 exemplifying the liquid crystal device, formed using what is known as Liquid Crystal On Silicon (LCOS) including a silicon substrate and liquid crystal provided thereon. Like the reflective liquid crystal devices 30, the reflective liquid crystal panels for the respective colors will be denoted as 31R, 31G, and 31B. The reflective liquid crystal devices 30 are disposed such that the reflective liquid crystal panels 31 become generally orthogonal to an optical axis of the light beam transmitted through the respective polarization splitter (not shown).

In the reflective liquid crystal panels 31, an alignment status of the liquid crystal is controlled, and a polarization direction of a light beam of incident light is modulated in accordance with a driving signal from a control unit (not shown), and the modulated light is reflected toward the dichroic mirrors 17, 18.

Further details of the reflective liquid crystal panels 31 will be subsequently described.

The projector 1 synthesizes the light modulated by the three reflective liquid crystal devices 30R, 30G, 30B with the dichroic mirrors 17, 18, and the polarizing beam splitter 15, and then projects the synthesized light on the screen S, through a projection lens 19.
Detailed Structure of the Reflective Liquid Crystal Panel The reflective liquid crystal panel will now be described in further detail, referring to the drawings.

Figure 2:
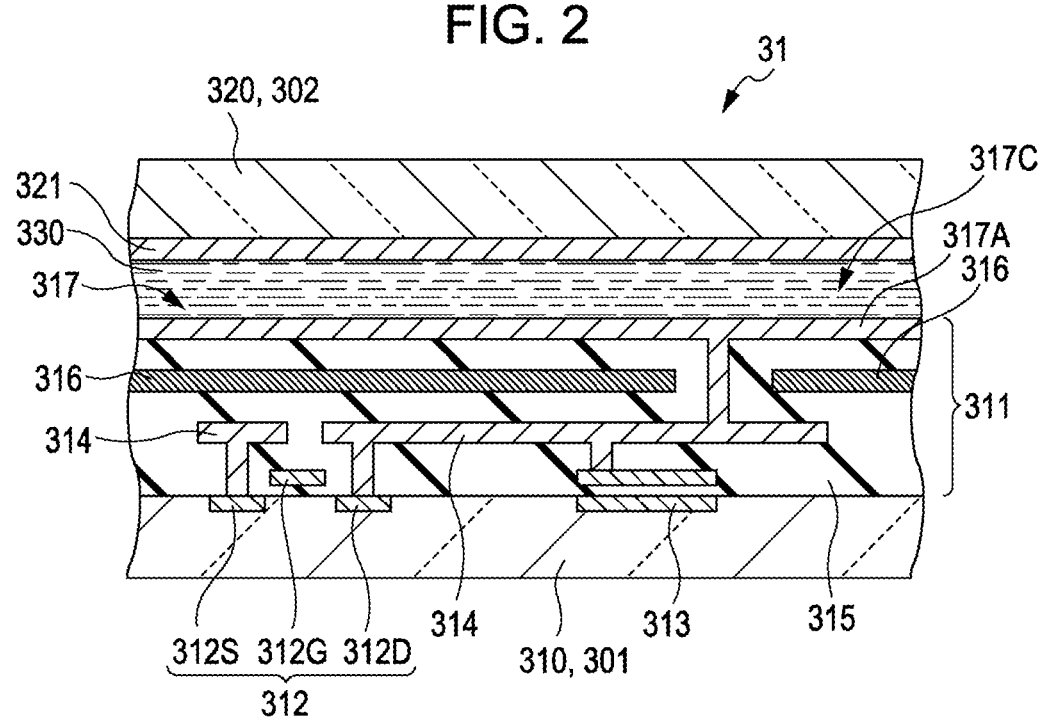
FIG. 2 is a fragmentary cross-sectional view of a reflective liquid crystal panel according to the first embodiment.
Figure 3:
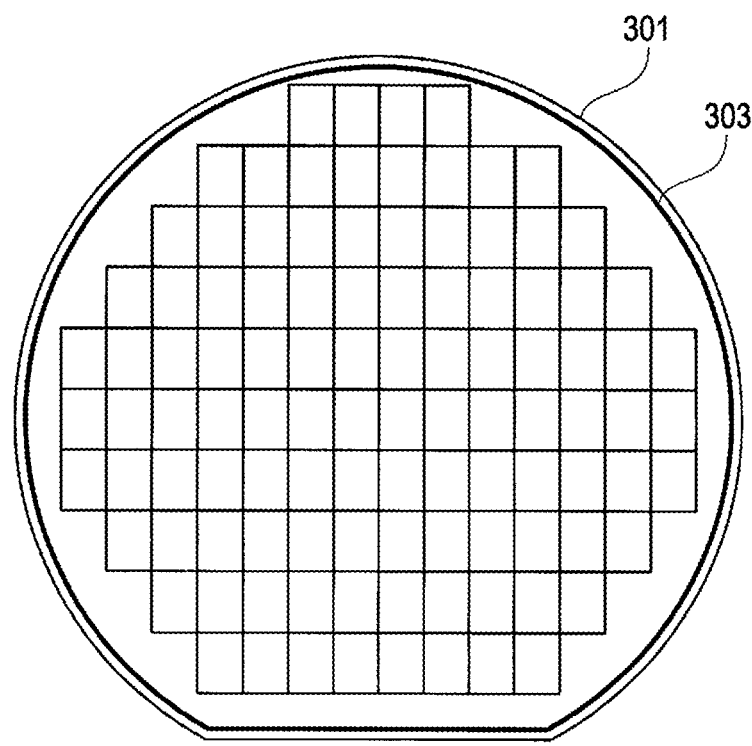
FIG. 3 is a plan view showing an element-side mother substrate according to the first embodiment.

FIG. 2 is a cross-sectional view showing a part of the reflective liquid crystal panel. FIG. 3 is a plan view showing an element-side mother substrate. In FIG. 3, locations of reflective electrodes and display element regions, which are metal layers formed on each element substrate, are indicated by solid lines in a checker pattern, for the sake of clarity.

The reflective liquid crystal panel 31 includes, as shown in FIG. 2, an element substrate 310 with a MOS Field Effect Transistor (hereinafter MOS-FET, an example of complementary transistors) array circuit 311 formed on a surface thereof, the MOS-FET array circuit 311 serving as the driver circuit, a counter substrate 320 with a transparent electrode 321 formed on a surface thereof, and liquid crystal 330 tightly enclosed between the element substrate 310 and the counter substrate 320.

The liquid crystal 330 may be constituted of one or a combination of an ester-based material, a biphenyl-based material, a phenylciclohexane-based material, a phenylpyridine-based material, a dioxane-based material, and so forth.

The element substrate 310 is, for example as shown in FIG. 3, formed in a plate shape cut out from an element-side mother substrate 301 which is a silicon wafer. Instead of the silicon wafer, quartz glass may be employed as in the case of the counter substrate 320. The MOS-FET array circuit 311 is provided on one of the surfaces of the element substrate 310.

The MOS-FET array circuit 311 includes a plurality of serial circuits in which a MOS-FET 312 and a capacitor 313 are serially connected through an interconnect 314 and aligned in a matrix pattern. The MOS-FET 312 includes a source 312S, a gate 312G, and a drain 312D, such that the drain 312D is connected to the capacitor 313 through the interconnect 314, and the gate 312G is connected to an interconnect from a driver IC (not shown) that drives the liquid crystal. The MOS-FET array circuit 311 also includes an insulating layer 315 formed on the same surface of the element substrate 310, and a light shielding layer 316 formed in the insulating layer 315. The light shielding layer 316 is provided along the surface of the element substrate 310, and includes a cutaway portion.

A plurality of pixel electrodes 317A, exemplifying the reflective electrode, are aligned in a matrix pattern in agreement with the position of the serial circuits on the insulating layer 315 of the MOS-FET array circuit 311, and a plurality of display element regions 317 including the liquid crystal 330 are superposed on each of the pixel electrodes 317A, in a matrix pattern. The pixel electrodes 317A are each connected to the serial circuit of the MOS-FET 312 and the capacitor 313 by means of the interconnect 314, through the cutaway portion of the light shielding layer 316. A region where the MOS-FET array circuit 311, the pixel electrode 317A and the display element region 317 are layered constitutes a layered region 317C (see FIG. 4).

Figure 4:
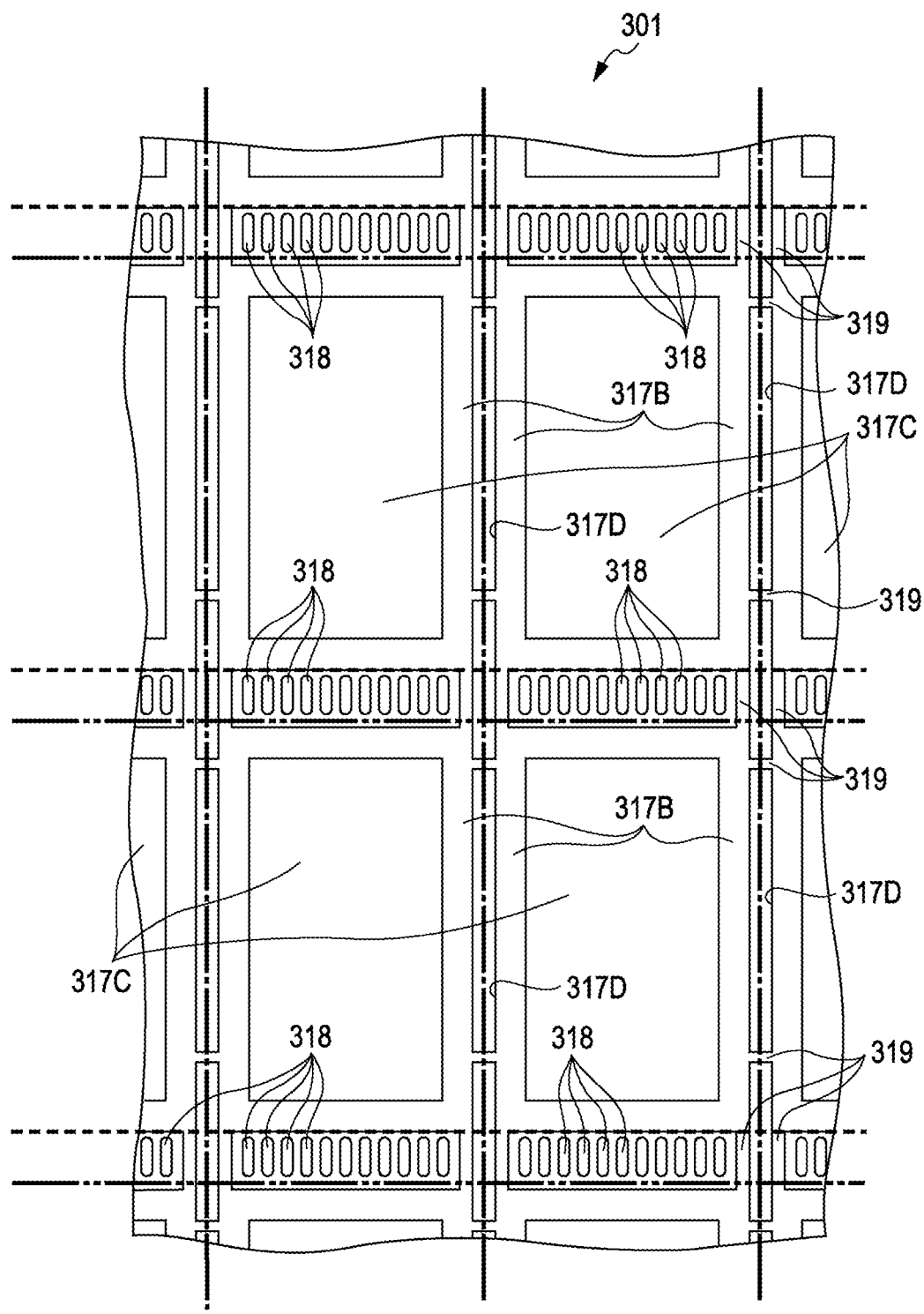
FIG. 4 is an enlarged plan view showing a part of the element-side mother substrate according to the first embodiment.
Figure 5:
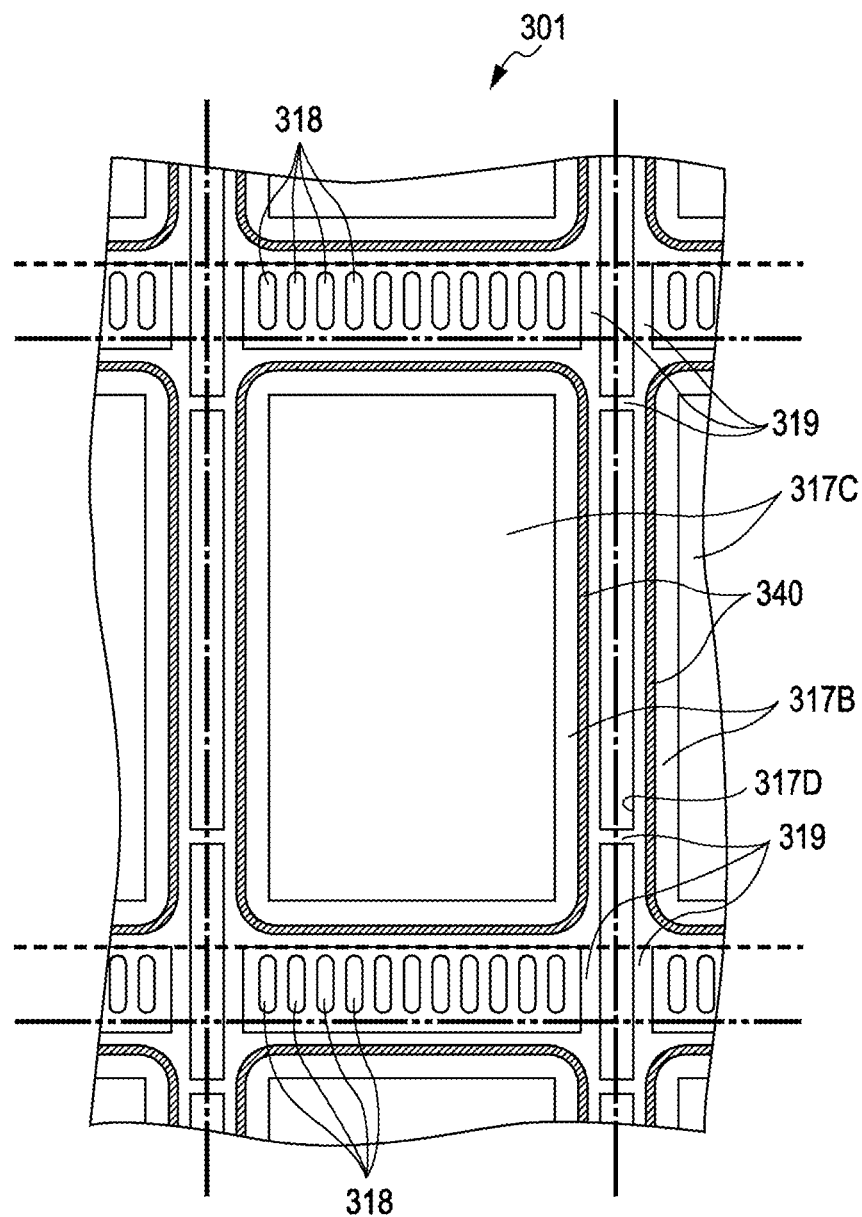
FIG. 5 is an enlarged plan view showing a part of the element-side mother substrate according to the first embodiment, with a seal member provided thereon.
Figure 6:
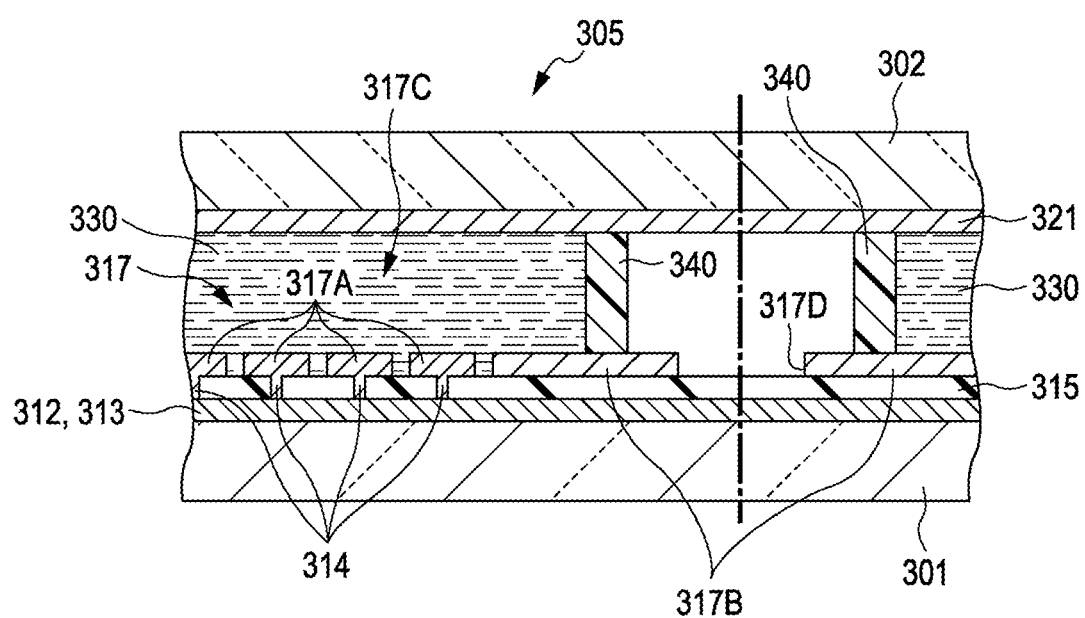
FIG. 6 is a partially cut away cross-sectional view of a bonded structure formed by bonding the element-side mother substrate and a counter mother substrate according to the first embodiment.

On the insulating layer 315 of the MOS-FET array circuit 311, an extension portion 317B of the reflective electrode, which is a metal layer, is also provided around the plurality of pixel electrodes 317A aligned in a matrix pattern (see FIGS. 4 to 6).

The counter substrate 320 is formed in a plate shape cut out from a counter mother substrate 302 which is a glass substrate, for example made of quartz glass (see FIG. 6).

A transparent electrode 321, formed by sputtering Indium Tin Oxide (ITO) for example, is provided on a surface of the counter substrate 320 opposing the element substrate 310. Here, the counter substrate 320 includes, though not shown, an alignment layer formed at least in a region corresponding to the display element region 317.

The reflective liquid crystal panel 31 includes a seal member (not shown in FIG. 2) formed between the element substrate 310 and the counter substrate 320 in a loop shape so as to surround the display element region 317.

The seal member may be composed of, for example, a photo-curable or thermosetting resin containing an acrylic resin and an epoxy resin. The seal member contains gap spacers constituted of silica balls or resin balls of a predetermined particle size, and conductive gap spacers formed by coating the silica balls or resin balls with a conductive material such as gold, so that those gap spacers serve to secure a predetermined interval between the element substrate 310 and the counter substrate 320. Naturally, different materials may be employed as the seal member.

In the reflective liquid crystal panel 31, the liquid crystal 330 is tightly enclosed in a space defined by the seal member, the element substrate 310, and the counter substrate 320.

The reflective liquid crystal panel 31 also includes a plurality of terminals 318 through which a driving voltage for turning on and off each MOS-FET 312 in the display element region 317 is applied (see FIGS. 4 and 5). Although FIGS. 4 and 5 depict eleven terminals 318 for convenience of description, the number of the terminals 318 is not specifically limited.

Manufacturing Method of Reflective Liquid Crystal Panel

Hereunder, a method of manufacturing the reflective liquid crystal panel 31 will be described referring to the drawings.

FIG. 4 is an enlarged plan view showing a part of the element-side mother substrate. FIG. 5 is an enlarged plan view showing a part of the element-side mother substrate with the seal member provided thereon. FIG. 6 is a partially cut away cross-sectional view of a bonded structure formed by bonding the element-side mother substrate and the counter mother substrate. In FIGS. 4 to 6, cutting positions on the element-side mother substrate are indicated by dash-dot lines and dash-dot-dot lines, and cutting positions on the counter mother substrate are indicated by dash-dot lines and broken lines.

First, the element-side mother substrate 301 constituted of a silicon wafer and the MOS-FET array circuits 311 formed thereon, and the counter mother substrate 302 constituted of a glass substrate and the transparent electrodes 321 formed thereon are prepared in advance.

As shown in FIGS. 4 and 5, the extension portions 317B associated with the respective reflective liquid crystal panels 31 are electrically connected to the extension portion 317B of the adjacent reflective liquid crystal panel 31 through connection paths 319 on the element-side mother substrate 301, for preventing the MOS-FET array circuit 311 from being damaged by electrostatic discharge. In other words, the connection paths 319 constituting a part of the extension portions 317B extend to the outer peripheral edge of the element substrate 310, which corresponds to the cutting position. Also, the MOS-FET array circuits 311 in the respective display element regions 317 are electrically connected through the interconnect 314 at the cutting position corresponding to the outer peripheral edge of the element substrate 310, as shown in FIG. 6. Here, a gap between the adjacently located extension portions 317B where the connection path 319 is not provided constitutes a discontinuous portion (opening) 317D.

A first manufacturing process is a seal member forming process. In this process, the seal member 340 is arranged on the element-side mother substrate 301 with the MOS-FET array circuit 311 formed thereon in advance, in a loop shape so as to surround each display element region 317, as shown in FIG. 5.

The seal member 340 is arranged in a loop shape so as to surround each layered region 317C, and so as not to be disposed on the cutting positions corresponding to the outer peripheral edge of the element substrate 310 of the reflective liquid crystal panel 31 (dash-dot lines and dash-dot-dot lines in FIGS. 4 and 5).

An additional seal member 303 is then provided, as shown in FIG. 3, in a ring shape along an outer peripheral edge of the element-side mother substrate 301. The seal member 303 may be formed in a double circle, instead of a single circle.

The seal member forming process is followed by a liquid crystal distribution process. In this process, a predetermined amount of liquid crystal 330 is dropped onto a central portion of the display element regions 317 on the element-side mother substrate 301 where the seal member 340 is now provided.

The liquid crystal distribution process is followed by a bonding process. Specifically, the counter mother substrate 302 and the element-side mother substrate 301 on which the liquid crystal 330 has been dropped are superposed as shown in FIG. 6, under an environment depressurized to, for example, approx. 133.322 Pa (1 Torr). Then after pressurizing in the direction of superposition to such an extent that the seal member 340 comes into contact with the counter mother substrate 302, the substrates are placed back under atmospheric pressure. Under atmospheric pressure, a space defined by the element-side mother substrate 301, the counter mother substrate 302, and the seal member 303 is pressurized by atmospheric pressure. Accordingly, since atmospheric pressure is uniformly applied to the entirety of the element-side mother substrate 301 and the counter mother substrate 302, each of the regions surrounded by the seal member 340 is also uniformly subjected to atmospheric pressure.

As stated earlier, the interval between the element-side mother substrate 301 and the counter mother substrate 302 is set to be a predetermined cell gap by the silica balls and the conductive material contained in the seal member 340 and the predetermined amount of liquid crystal 330.

Then the bonded substrates are irradiated with UV light from which components under 350 nm are cut, at an intensity of 3000 mJ/cm$^2$ from the side of the counter mother substrate 302, so that the acrylic component of the seal member 340 is cured. After that, the bonded substrates are subjected to heat of 120° C. for an hour so that the epoxy component is cured and thus the seal member 340 is cured. At this stage, the bonded structure 305 shown in FIG. 6 is obtained.

The bonding process is followed by a cutting process. In this process, specifically, scribe lines are drawn by a scriber along the positions corresponding to the outer peripheral edge of the reflective liquid crystal panel 31 (dash-dot lines, dash-dot-dot lines and broken lines in FIGS. 4 to 6), a force is applied to both the element-side mother substrate 301 and the counter mother substrate 302 from an out-of-plane direction, so as to cut the bonded structure into each reflective liquid crystal panel 31.

To be more specific, the element-side mother substrate 301 is cut at the positions indicated by the dash-dot lines and dash-dot-dot lines in FIGS. 4 and 5, and the counter mother substrate 302 is cut at the positions indicated by the dash-dot lines in FIGS. 4 to 6 and the broken lines in FIGS. 4 and 5, thus to obtain the reflective liquid crystal panels 31.

Advantages of First Embodiment

In the first embodiment, the extension portion 317B and the seal member 340 are not superposed in the regions along the outer peripheral edge of the element substrates 310. In other words, the seal member 340 for enclosing the liquid crystal 330 is provided so as not to be located at the outer peripheral edge of the element substrates 310.

Accordingly the seal member 340 is not disposed in the regions along the outer peripheral edge of the element substrates 310, which corresponds to the cutting positions, and therefore the seal member 340 is kept from being cut in the process of cutting the element substrates 310 out of the element-side mother substrate 301. Thus the seal member 340 is not subjected to a tensile force applied at the time of cutting, and hence the extension portion 317B under the seal member 340, and also the MOS-FET array circuit 311 under the extension portion 317B are not subjected to the tensile force. Such a configuration prevents, consequently, the extension portion 317B and the MOS-FET array circuit 311 from being stripped off or cut owing to the tensile force, thereby improving manufacturing yield, which results in reduced manufacturing cost.

In the first embodiment, the reflective liquid crystal panel 31 is formed through the sequential process of seal forming, liquid crystal distribution, and bonding.

Such an arrangement allows the seal member 340 to be formed in a closed loop, thereby eliminating the need to form a liquid crystal inlet as in existing devices.

In the first embodiment, the seal member 340 contains a conductive material.

Such a composition allows the MOS-FET array circuit 311 of the element substrate 310 and the transparent electrode 321 of the counter substrate 320 to be electrically connected to each other. Accordingly, a circuit configuration that allows the MOS-FET 312 to be turned on and off with respect to each pixel in the display element region 317 can be obtained without the need to additionally provide a structure for securing the electrical connection, which leads to improved manufacturing efficiency. In particular, employing a conductive material formed in a predetermined particle size so as to be utilized as gap spacers like silica balls allows the interval between the substrates to be set at a cell gap of a predetermined size with only the conductive material, without the need to employ silica balls, thereby contributing to stabilizing the quality level among the individual products.

Also, according to the first embodiment the extension portions 317B include the connection paths 319 for electrical connection to the adjacent extension portions 317B.

Such a configuration prevents, in the case where static electricity is generated in a manufacturing process such as an alignment process of the element-side mother substrate 301, the extension portion 317B from being charged with the static electricity, so that the extension portions 317B over the entirety of the element-side mother substrate 301 come to have the same potential and thus electrostatic discharge can be suppressed. Consequently, the MOS-FET array circuit 311 can be prevented from being damaged by electrostatic discharge, which leads to improved manufacturing yield.

Further, according to the first embodiment the seal member 303 is arranged along the outer peripheral edge of the element-side mother substrate 301.

Because of such a configuration, placing the element-side mother substrate 301 and the counter mother substrate 302 bonded together under a depressurized condition back under atmospheric pressure allows all portions of the bonded structure to be uniformly subjected to atmospheric pressure. Such an arrangement contributes to stabilizing the quality level of the reflective liquid crystal panels 31.

Second Embodiment

Now, a second embodiment of the invention will be described referring to the drawings.

The second embodiment represents the case where the seal member 340 of the first embodiment is serially formed in a loop shape, by what is known as single-stroke drawing. Regarding the second embodiment, the constituents same as those of the first embodiment are given the same numeral, and description thereof will not be repeated.

Figure 7:
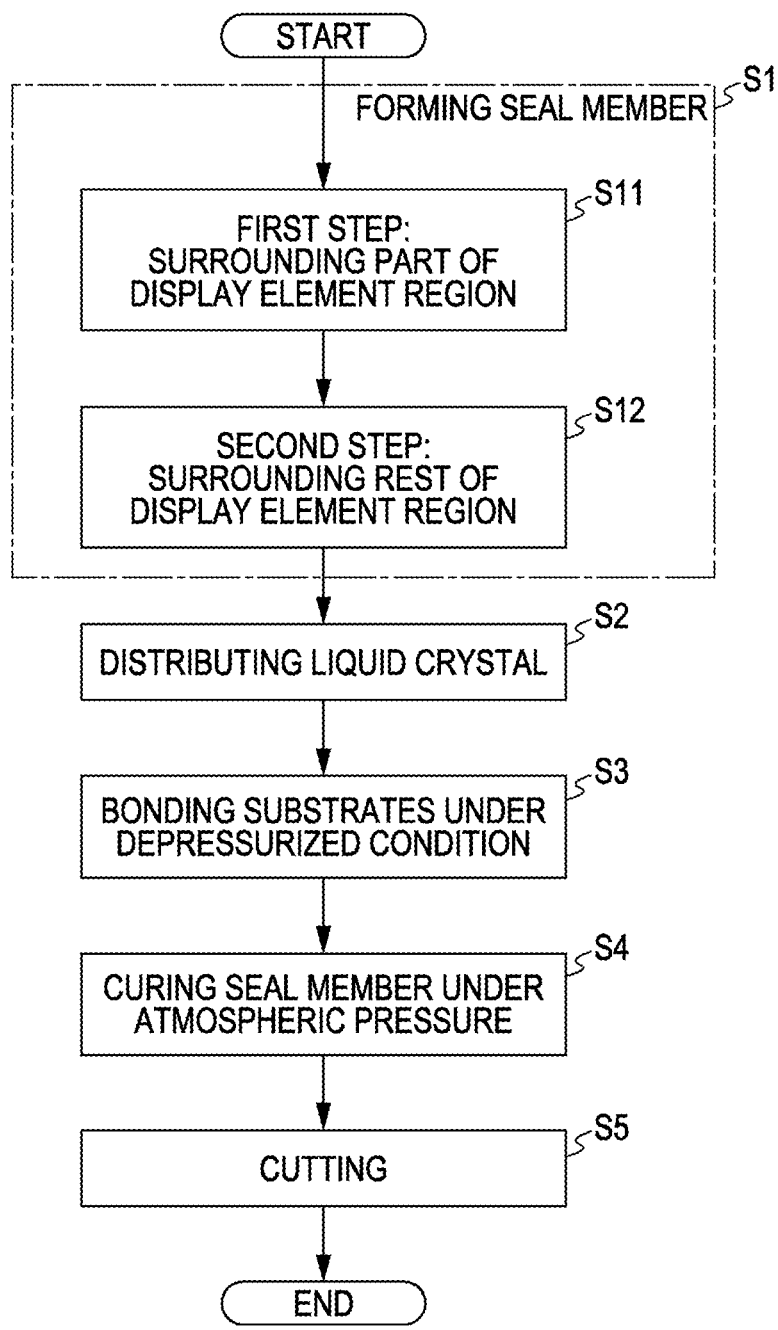
FIG. 7 is a flowchart showing a manufacturing method according to a second embodiment of the invention.
Figure 8:
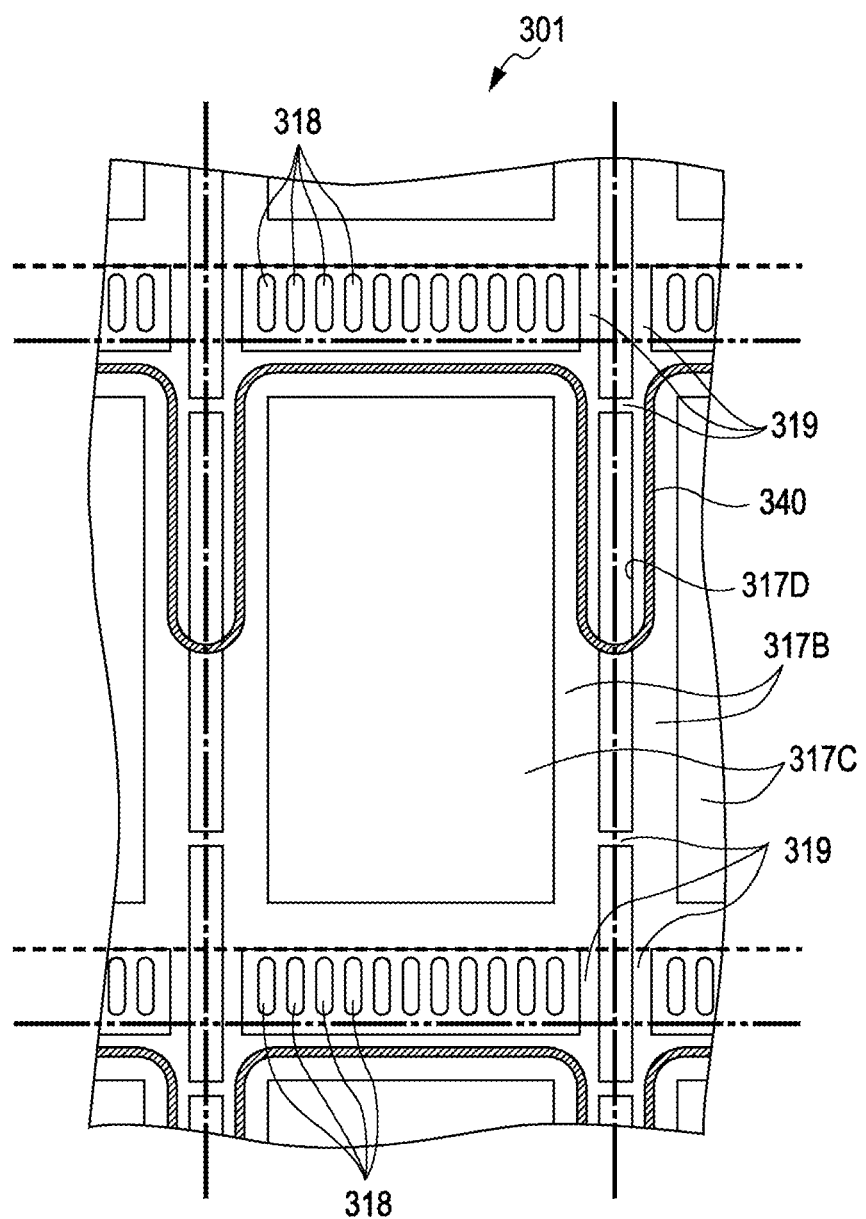
FIG. 8 is a plan view showing a part of the element-side mother substrate with the seal member formed thereon through a first seal forming process according to the second embodiment.
Figure 9:
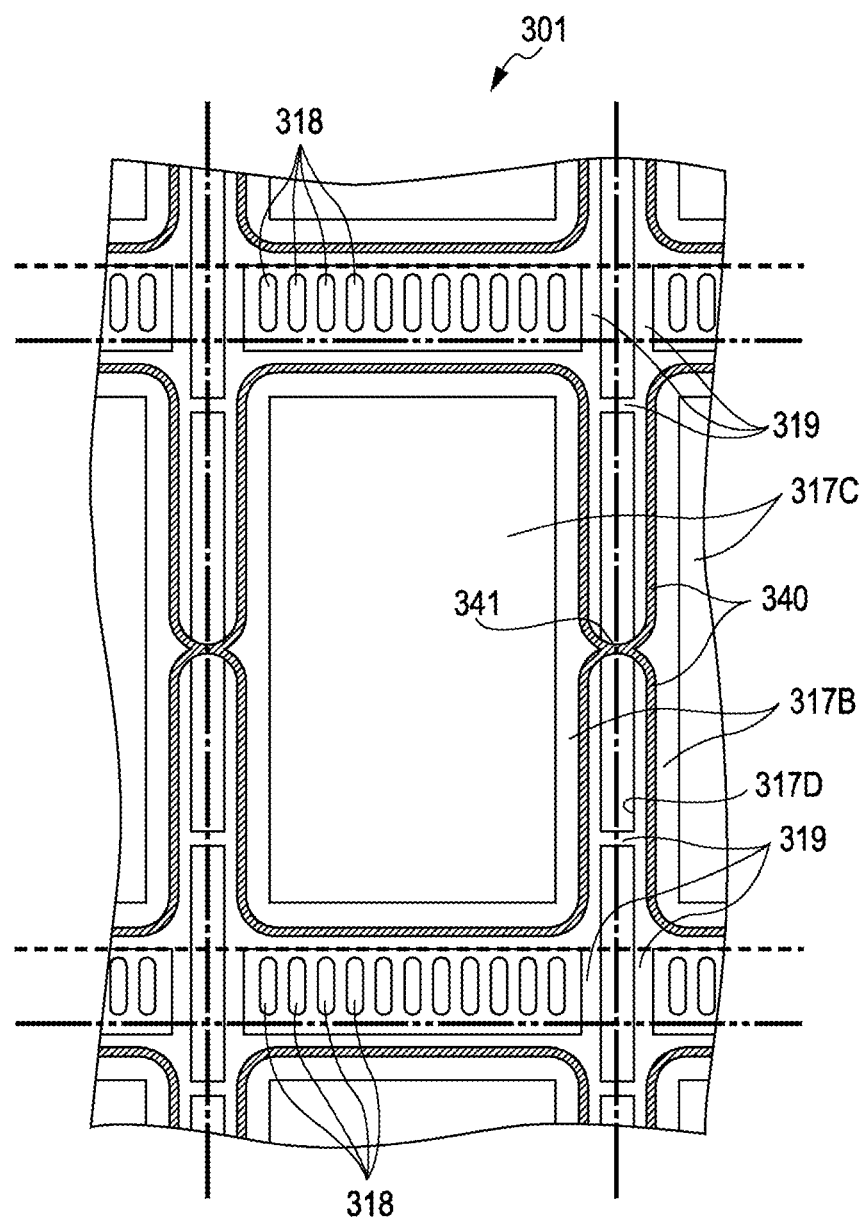
FIG. 9 is a plan view showing a part of the element-side mother substrate with the seal member for a reflective liquid crystal panel according to the second embodiment.
Figure 10:
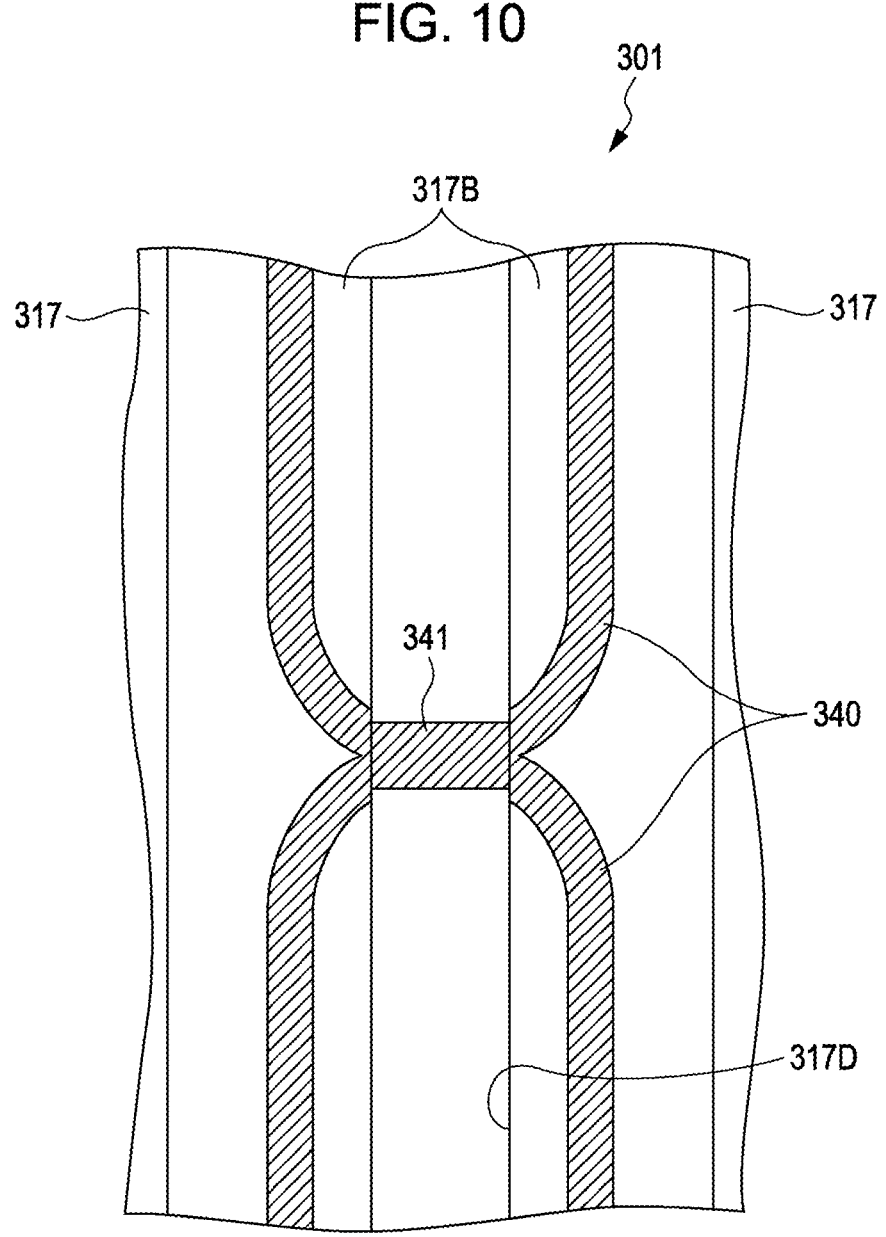
FIG. 10 is an enlarged plan view showing a part of the element-side mother substrate with the seal member provided close to a cutting position, according to the second embodiment.

FIG. 7 is a flowchart showing a manufacturing method. FIG. 8 is a plan view showing a part of the element-side mother substrate with the seal member formed thereon through a first seal forming process. FIG. 9 is a plan view showing a part of the element-side mother substrate with the seal member for the reflective liquid crystal panel. FIG. 10 is a plan view showing a part of the element-side mother substrate with the seal member provided close to the cutting position.

Manufacturing Method of the Reflective Liquid Crystal Panel

To manufacture the reflective liquid crystal panel 31, the element-side mother substrate 301 with the MOS-FET array circuits 311 formed thereon, and the counter mother substrate 302 (not shown) constituted of a glass substrate and the transparent electrodes 321 formed thereon are prepared in advance, as in the first embodiment.

Referring now to FIG. 7, first the seal member forming process S1 is performed. The seal member forming process S1 in which the seal member 340 is arranged in a loop shape so as to surround the display element region 317, and includes a first step S11 corresponding to the first seal forming process and a second step S12 corresponding to the second seal forming process, to be serially performed.

To be more specific, in the first step S11 the seal member 340 is continuously arranged by single-stroke drawing through a part of the regions surrounding the display element regions 317 as shown in FIG. 8, in a direction in which the display element regions 317 are aligned on the element-side mother substrate 301, i.e., in a horizontal direction in FIG. 8.

The seal member 340 is provided on the discontinuous portions 317D, which are openings formed between the adjacently located extension portions 317B. In other words, the seal member 340 is provided on the discontinuous portion 317D formed along the positions at which the element-side mother substrate 301 is to be cut as will be subsequently described, where the extension portions 317B and the connection paths 319 are not disposed, so that the seal member 340 is not superposed on the extension portion 317B. The first step S11 thus arranged is followed by the second step S12.

In the second step S12, the seal member 340 is continuously arranged by single-stroke drawing through the rest of the regions surrounding the display element regions 317 as shown in FIG. 9, in a direction in which the display element regions 317 are aligned, on the element-side mother substrate 301 on which the seal member 340 has been provided so as to surround a part of the display element regions 317.

In the process of routing the seal member 340 through the rest of the regions surrounding the display element regions 317, it is preferable to overwrite the seal member 340 right upon the first provided seal member 340 at crossover portions 341 where the first provided seal member 340 is continuously arranged across the boundary between the adjacently located display element regions 317. In this case, the crossover portion 341 of the first provided seal member 340 blocks a tip portion of a dispenser supplying the seal member 340, so that the seal member 340 is barely squeezed out, and therefore an amount of the seal member 340 provided at the crossover portions 341 is not increased to double compared with the remaining portions of the seal member 340. Accordingly, as will be subsequently described, the crossover portion 341 of the seal member 340 is prevented from collapsing over a wider width in the bonding process S3 of bonding the element-side mother substrate 301 and the counter mother substrate 302. Here, although it is permissible that the seal member 340 slightly deviates from the first one at the crossover portions 341 (with a smaller overlapping area), it is preferable to overwrite such that the seal members 340 perfectly overlap with the first one, because the crossover portion 341 becomes wider as the seal member 340 deviates more.

Suppressing thus the width of the crossover portion 341 of the seal member 340 prevents a contact area between the seal member 340 and the MOS-FET array circuit 311 from increasing, thereby suppressing the adhesion strength from becoming excessive. Accordingly, the MOS-FET array circuit 311 can be prevented from suffering a tensile force generated in the cutting process of the seal member 340 to be subsequently described, thus avoiding being damaged.

Upon completing the first step S11 and the second step S12, the seal member 340 is formed in a loop shape so as to surround each of the display element regions 317, in other words the layered regions 317C are surrounded by the loop-shaped seal member 340.

The seal member forming process S1 is followed, as shown in FIG. 7, by the liquid crystal distribution process S2 including distributing the liquid crystal 330 in the display element regions 317 surrounded by the seal member 340, as in the first embodiment.

Then the liquid crystal distribution process S2 is followed by the bonding process S3 as in the first embodiment. Specifically, after the bonding process S3 of the element-side mother substrate 301 and the counter mother substrate 302 under a depressurized condition, the bonded substrates are released into under atmospheric pressure, so that a curing process S4 of the seal member 340 is performed.

Here, the seal member 340 is superposed on the extension portion 317B in the regions surrounding the display element regions 317 where the seal member 340 is provided in a loop shape. In contrast, the seal member 340 is not superposed on the extension portion 317B at the crossover portions 341 where the seal member 340 is continuously arranged across the borderline between the adjacently located display element regions 317. Accordingly, with respect to the regions where the seal member 340 is provided, a gap between the element-side mother substrate 301 and the counter mother substrate 302 is wider at the crossover portions 341 by an amount corresponding to the thickness of the extension portion 317B. The crossover portions 341 are, therefore, less likely to collapse than the portion of the seal member 340 superposed on the extension portions 317B surrounding the display element regions 317, in the bonding process of the element-side mother substrate 301 and the counter mother substrate 302, and presents a considerably narrow width as shown in FIG. 10.

After the curing process S4 of the seal member 340, scribe lines are drawn on the element-side mother substrate 301 and the counter mother substrate 302 and then a force is applied thereto from an out-of-plane direction as in the first embodiment, so that the reflective liquid crystal panels 31 are cut out.

Referring to FIG. 10, since the crossover portions 341 of the seal member 340 are formed in a narrower width than the remaining portions thereof, the seal member 340 is selectively cut at the crossover portions 341 in the cutting process S5. Accordingly, although a tensile force is exerted to the seal member 340 in the cutting process S5, the tensile force can be suppressed from being exerted to the extension portions 317B.

Advantages of Second Embodiment

In the second embodiment described above, in the first step S11 the seal member 340 is continuously arranged by single-stroke drawing through a part of the regions surrounding the display element regions 317 on the element-side mother substrate 301, in a direction in which the plurality of display element regions 317 are aligned. Further, in the second step S12 the seal member 340 is continuously arranged by single-stroke drawing through the rest of the regions surrounding the display element regions 317, in a direction in which the display element regions 317 are aligned, so that the seal member 340 is arranged in a loop shape so as to surround each of the display element regions 317.

Successively performing the first step S11 and the second step S12 as above allows the seal member 340 to be provided in the regions surrounding the plurality of display element regions 317, in a direction in which those regions are aligned, thereby improving manufacturing efficiency. Also, through the first step S11 and the second step S12, the seal member 340 is not superposed on the extension portions 317B and the connection paths 319 at the positions between the adjacently located display element regions 317, corresponding to the positions to be cut in the cutting process S5, as in the first embodiment. Accordingly, although a tensile force is exerted to the seal member 340 in the cutting process S5, the tensile force can be suppressed from being exerted to the extension portions 317B and the connection paths 319. Such an arrangement allows the seal member 340 to be serially and efficiently provided, and prevents the MOS-FET array circuit 311 from being stripped off or cut, thereby improving manufacturing yield.

In the second embodiment, the seal member 340 includes the crossover portions 341 where the seal member 340 is continuously arranged across the regions where the extension portions 317B and the connection paths 319 are not provided.

Accordingly, the crossover portions 341 of the seal member 340 are formed in a narrower width than the remaining portions thereof, and hence the seal member 340 is selectively cut at the crossover portions 341 in the cutting process S5. Therefore, a tensile force generated in the cutting process of the seal member 340 can be suppressed from being exerted to other constituents. Such a configuration allows the seal member 340 to be serially provided, which leads to improved manufacturing efficiency, while also preventing the MOS-FET array circuits 311 from being stripped off or cut, thereby improving manufacturing yield.

In the second embodiment, further, the seal member 340 contains a conductive material and the connection paths 319 are provided, as in the first embodiment.

Therefore, the same advantages as those offered by the first embodiment can also be attained, because of to the foregoing configuration.

Third Embodiment

A third embodiment of the invention will be described hereunder, referring to FIG. 11.

Figure 11:
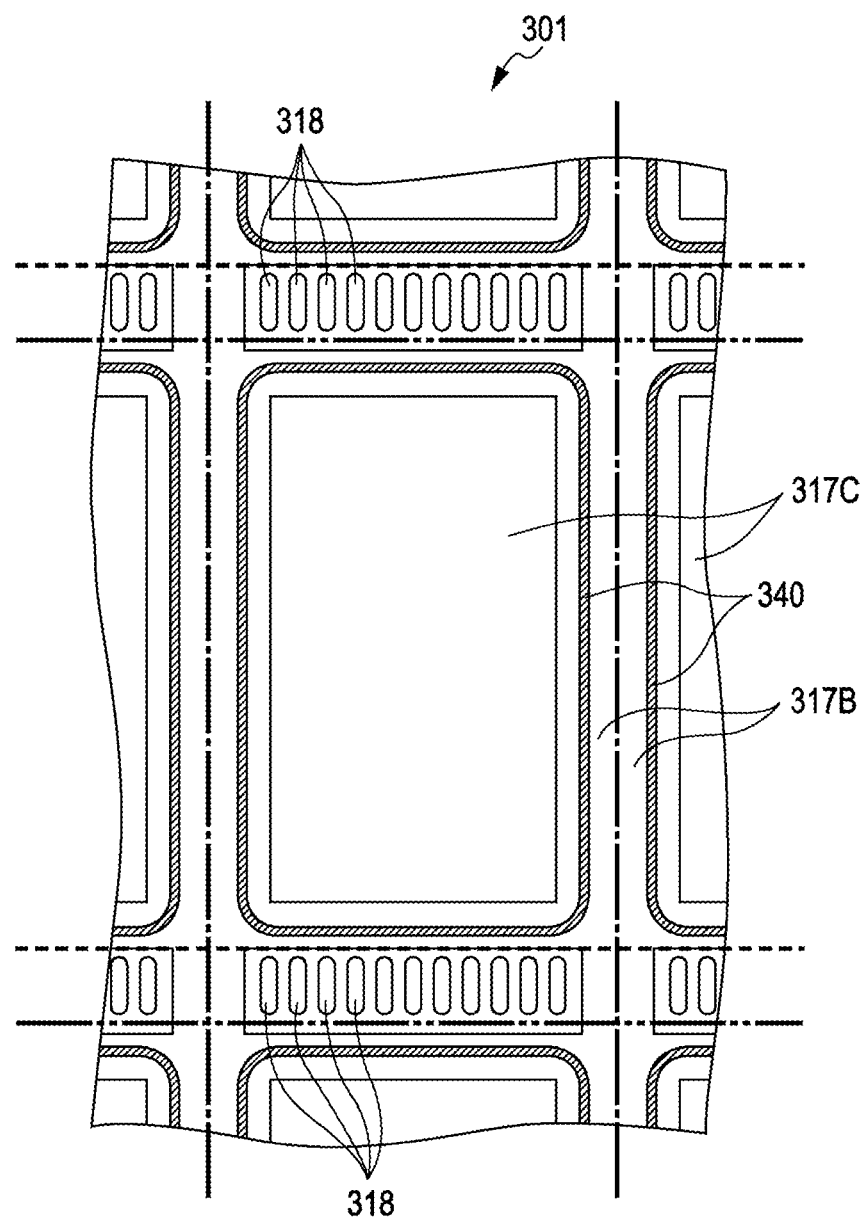
FIG. 11 is a plan view showing a part of the element-side mother substrate with the seal member according to a third embodiment.

FIG. 11 is a plan view showing a part of the element-side mother substrate with the seal member according to the third embodiment.

In the third embodiment, the discontinuous portions 317D are not provided between the adjacently located extension portions 317B, and the extension portions 317B are hence continuously formed over the entire regions between the display element regions 317, unlike in the first embodiment. The seal member 340 according to the third embodiment is formed in a closed loop as in the first embodiment, and is not located in the regions corresponding to the cutting position of the extension portions 317B.

Such a configuration according to the third embodiment can also prevent, as in the first and the second embodiment, the extension portion 317B and the MOS-FET array circuit 311 from being stripped off or cut by a tensile force generated in the cutting process, thereby improving manufacturing yield.

Fourth Embodiment

A fourth embodiment of the invention will be described hereunder, referring to FIG. 12.

Figure 12:
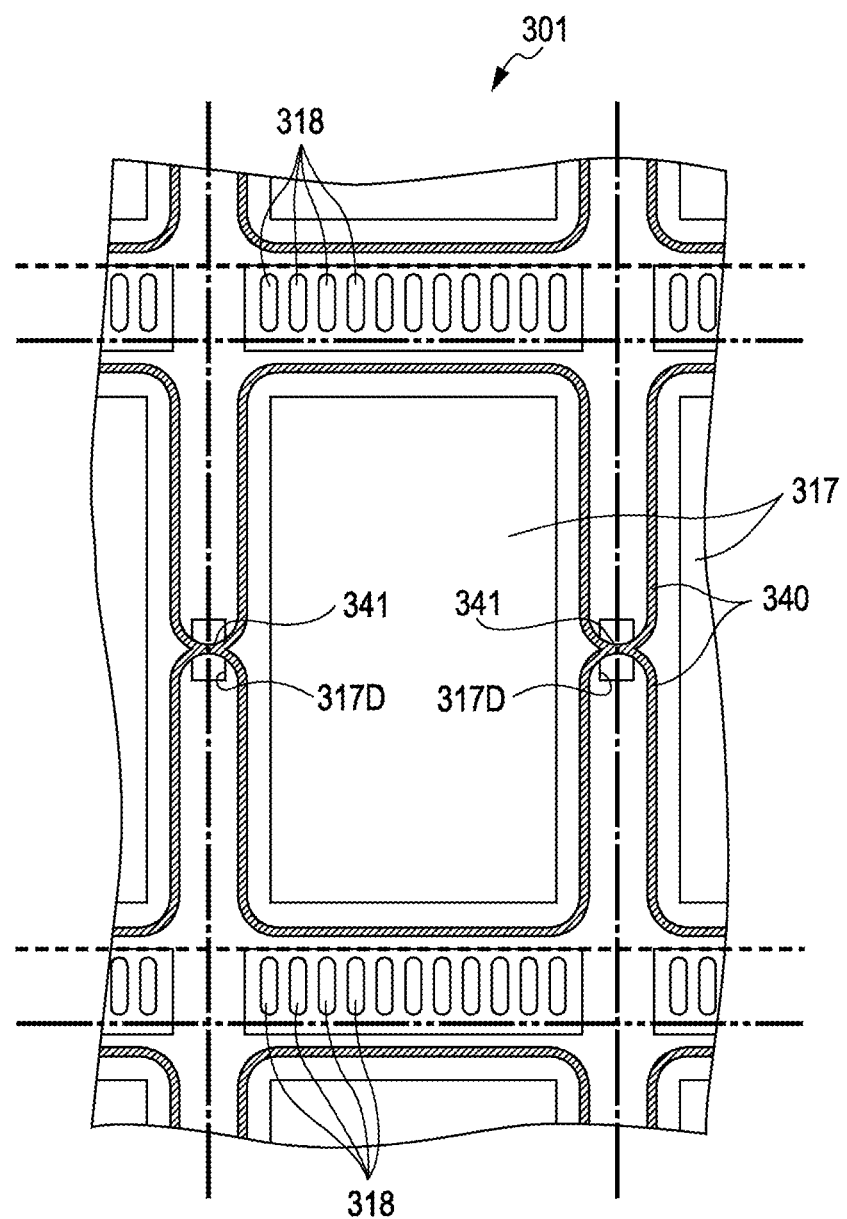
FIG. 12 is a plan view showing a part of the element-side mother substrate with the seal member according to a fourth embodiment.

FIG. 12 is a plan view showing a part of the element-side mother substrate with the seal member according to the fourth embodiment.

In the fourth embodiment, the seal member 340 is continuously arranged by single-stroke drawing as in the second embodiment, on a structure where the extension portions 317B are aligned as in the third embodiment shown in FIG. 11. In other words, in the fourth embodiment the discontinuous portions 317D are provided in the regions corresponding to the positions to be cut in the cutting process, and the seal member 340 is arranged through the discontinuous portions 317D.

Such a configuration according to the fourth embodiment can also prevent, as in the foregoing embodiments, the extension portion 317B and the MOS-FET array circuit 311 from being stripped off or cut by a tensile force generated in the cutting process, thereby improving manufacturing yield. Further, since the seal member 340 is arranged by single-stroke drawing as in the second embodiment, manufacturing efficiency can be improved.

Fifth Embodiment

A fifth embodiment of the invention will be described hereunder, referring to FIG. 13.

Figure 13:
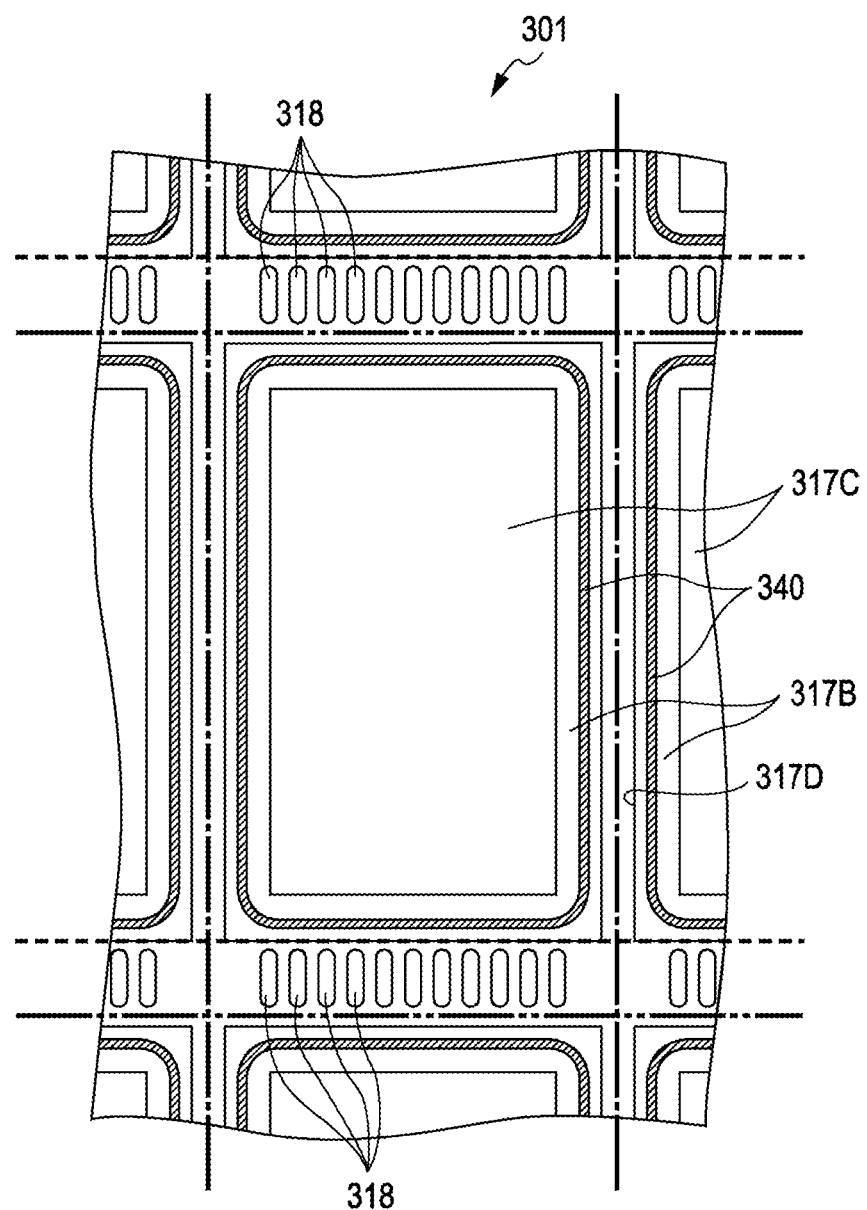
FIG. 13 is a plan view showing a part of the element-side mother substrate with the seal member according to a fifth embodiment.

FIG. 13 is a plan view showing a part of the element-side mother substrate with the seal member according to the fifth embodiment.

In the fifth embodiment, the connection paths 319 are not provided, and the extension portions 317B are each formed in an island shape.

In this case, it is preferable to extend the MOS-FET array circuit 311 to the outer peripheral edge of the element substrate 310 like the connection path 319, so that the MOS-FET array circuits 311 of the adjacently located element substrates 310 are electrically connected to each other. Such a configuration prevents the MOS-FET array circuit 311 from being damaged by electrostatic discharge, as the configuration including the connection paths 319.

Also, both of the seal member 340 and the extension portions 317B may be excluded from the regions corresponding to the outer peripheral edge of the element substrate 310, as in the fifth embodiment.

Modifications of the Embodiments

It is to be noted that the invention is in no way limited to the foregoing embodiments, but encompasses various modifications and improvements made within the scope of the invention.

For example, the methods of routing the seal member 340 in a loop shape so as to surround each display element region 317, but not to overlap with the extension portions 317B and the connection paths 319 on the cutting positions of the element-side mother substrate 301 and the counter mother substrate 302 display element region 317, are not limited to the foregoing embodiments.

Although the alignment direction of the display element regions 317, along which the seal member 340 is to be continuously arranged, is set in a horizontal direction in FIGS. 8, 9, and 12 in the second and the fourth embodiment, the display element regions 317 may be aligned such that the seal member 340 is arranged in a vertical direction.

Although the seal member 340 of the foregoing embodiments contains the gap spacers and the conductive gap spacers, different materials may be employed.

To cite a few examples, gap spacers prepared separately from the seal member 340 may be employed, and the gap spacers may be excluded from the seal member 340. Alternatively, a separate structure that secures electrical connection between the element substrate 310 and the counter substrate 320 may be provided, so that conductive materials can be excluded from the seal member 340.

Further, instead of a mixture of a photo-curable acrylic-based resin and a thermosetting epoxy-based resin, a material containing only either of the photo-curable resin or thermosetting resin may be employed.

Further, although the seal member 340 is provided on the element-side mother substrate 301 and the liquid crystal 330 is dropped onto the element-side mother substrate 301, different arrangements may be employed.

For example, the seal member 340 may be provided in a loop shape on the counter mother substrate 302 along the regions opposing the display element regions 317 of the element-side mother substrate 301 bonded to the counter mother substrate 302. In this case, the liquid crystal 330 may be dropped onto the regions on the counter mother substrate 302 surrounded by the seal member 340, and then the element-side mother substrate 301 may be bonded to the counter mother substrate 302.

Although the liquid crystal device of the invention is exemplified by the reflective liquid crystal panels 31 employed in the 3LCD projector 1 and the reflective liquid crystal panels 31 each serve to modulate a single color in the first embodiment, the invention may be applied to different devices. For example, the reflective liquid crystal panel may be constituted of a quartz glass substrate and three color filters for RGB provided thereon. The reflective liquid crystal panel including such color filters may be suitably employed as a viewfinder of a digital camera or the like. Other examples of the electronic device including the reflective liquid crystal panel 31 include a portable pico projector, a head-mounted display, and an on-board head-up display for projection on a front glass of a vehicle.

Although the second embodiment represents the case where the seal member 340 is arranged so as to overwrite right upon the crossover portion 341 of the first provided seal member 340 in the second step S12, the seal member 340 may be otherwise arranged.

For example, the drawing may be stopped, in other words the dispensing of the seal member 340 may be stopped, immediately before the position overlapping with the crossover portion 341 of the seal member 340, and the dispenser may be moved over the crossover portion 341 with the dispensing action stopped, and then the dispensing of the seal member 340 may be restarted immediately before deviating from the position drawn in the first step S11.

What is claimed is:
1. A liquid crystal device comprising:
an element substrate provided on a first surface with a driver circuit and a metal layer covering the driver circuit, the metal layer comprising a plurality of pixel electrodes and an extension portion provided around the plurality of pixel electrodes;

a counter substrate disposed so as to oppose the first surface of the element substrate, and including a transparent electrode formed on a surface opposing the element substrate;
a seal member provided between the element substrate and the counter substrate in a loop shape so as to surround at least a part of the metal layer in plan view; and
liquid crystal enclosed in a region surrounded by the seal member;
wherein at least a part of the extension portion of the metal layer is formed so as to extend as far as an outer peripheral edge of the element substrate, and
wherein the seal member is not disposed in a region along the outer peripheral edge of the element substrate.

2. The liquid crystal device according to claim 1, wherein at least a part of the driver circuit is formed so as to extend as far as an outer peripheral edge of the element substrate.

3. The liquid crystal device according to claim 1, wherein the seal member contains a conductive gap spacer.

4. An electronic device comprising the liquid crystal device according to claim 1.

5. A liquid crystal device comprising:
an element substrate provided on a first surface with a driver circuit and a metal layer covering the driver circuit, the metal layer comprising a plurality of pixel electrodes and an extension portion provided around the plurality of pixel electrodes;
a counter substrate disposed so as to oppose the first surface of the element substrate, and including a transparent electrode formed on a surface opposing the element substrate;
a seal member provided between the element substrate and the counter substrate in a loop shape so as to surround at least a part of the metal layer in plan view; and
liquid crystal enclosed in a region surrounded by the seal member;
an outer peripheral edge of the element substrate including a first region on which the extension portion of the metal layer is formed so as to extend as far as the outer peripheral edge of the element substrate and a second region on which the metal layer is not disposed in a region along the outer peripheral edge of the element substrate, and
wherein the seal member is not disposed at the outer peripheral edge in the first region.

6. The liquid crystal device according to claim 5, wherein the second region has a first length, which is along one of the outer peripheral edge of the element substrate and one edge of the seal member, and a second length, which is defined by a distance between the edge of the seal member and the one of the outer peripheral edge of the element substrate, and
the first length is greater than the second length.

7. A liquid crystal device comprising:
an element substrate and a counter substrate that opposes the element substrate;
the element substrate being provided on a first surface with a driver circuit and a metal layer covering the driver circuit, the first surface including a first region that includes a plurality of pixel electrodes and opposes the counter substrate, and a second region that surrounds the first region and opposes the counter substrate;
a seal member provided on the second region, and between the element substrate and the counter substrate in a loop shape so as to surround the first region in plan view; and
liquid crystal enclosed in a region surrounded by the seal member;
the second region including at least a third region, on which the metal layer is not formed and extending as far as the outer peripheral edge of the element substrate, and a fourth region on which the metal layer is formed and extending as far as the outer the outer peripheral edge of the element substrate, and
wherein the seal member is not disposed at the outer peripheral edge in the fourth region.

8. An electronic device, comprising:
an element substrate that has a first surface and a second surface opposite to the first surface, an outline of the element substrate being constituted by a plurality of sides;
a counter substrate that has a third surface and a fourth surface opposite to the third surface;
a seal member; and
a reflective member,
a peripheral member that is disposed between the one side of the plurality of sides and the reflective member,
a first distance between the first surface and the third surface being smaller than a second distance between the first surface and the fourth surface;
a third distance between the second surface and the third surface being greater than the first distance,
a part of at least a part of a driver circuit being disposed between the first surface and the third surface,
the peripheral member being disposed between the first surface and the third surface,
at least one of a portion of the peripheral member and a portion of the seal member not being included in a cross sectional view including the one side.

9. The electronic device according to claim 8, wherein the electronic device is configured such that a light entering the electronic device is reflected by the reflective member.

10. A liquid crystal device, comprising:
an element substrate that has a first surface and a second surface opposite to the first surface, an outline of the element substrate being constituted by a plurality of sides;
a counter substrate that has a third surface and a fourth surface opposite to the third surface;
a seal member provided between the element substrate and the counter substrate in a loop shape so as to surround at least a part of the metal layer in plan view;
liquid crystal enclosed in a region surrounded by the seal member; and
a reflective member,
a peripheral member that is disposed between the one side of the plurality of sides and the reflective member,
a first distance between the first surface and the third surface being smaller than a second distance between the first surface and the fourth surface;
a third distance between the second surface and the third surface being greater than the first distance,
a part of at least a part of a driver circuit being disposed between the first surface and the third surface,
the peripheral member being disposed between the first surface and the third surface,
at least one of a portion of the peripheral member and a portion of the seal member not being included in a cross sectional view including the one side.

11. The liquid crystal device according to claim 10, wherein the liquid crystal is configured such that a light entering the liquid crystal device is reflected by the reflective member.

* * * * *